(12) United States Patent
Zhang et al.

(10) Patent No.: US 11,460,962 B1
(45) Date of Patent: Oct. 4, 2022

(54) TOUCH DETECTION METHOD, MEDIUM, TOUCH CONTROL CHIP AND TOUCH CONTROL DISPLAY DEVICE

(71) Applicant: SILEAD INC., Shanghai (CN)

(72) Inventors: Wukang Zhang, Shanghai (CN); Jun Yang, Shanghai (CN)

(73) Assignee: SILEAD INC., Shanghai (CN)

( * ) Notice: Subject to any disclaimer, the term of this patent is extended or adjusted under 35 U.S.C. 154(b) by 0 days.

(21) Appl. No.: 17/518,708

(22) Filed: Nov. 4, 2021

(30) Foreign Application Priority Data

Jul. 9, 2021 (CN) .......................... 202110779037.9

(51) Int. Cl.
*G06F 3/044* (2006.01)
*G06F 3/041* (2006.01)

(52) U.S. Cl.
CPC .......... *G06F 3/044* (2013.01); *G06F 3/04166* (2019.05)

(58) Field of Classification Search
CPC .............................. G06F 3/044; G06F 3/04166
See application file for complete search history.

(56) References Cited

U.S. PATENT DOCUMENTS

| 2019/0079609 | A1* | 3/2019 | Jiang | G06F 3/04166 |
| 2019/0385551 | A1* | 12/2019 | Kim | G06F 3/041 |
| 2021/0373736 | A1* | 12/2021 | Chen | G06F 3/04184 |

* cited by examiner

*Primary Examiner* — Robin J Mishler
(74) *Attorney, Agent, or Firm* — Ziegler IP Law Group, LLC

(57) ABSTRACT

A touch detection method, a touch control chip and a touch control display device are disclosed. In the touch detection method, coded data is loaded in drive channels and collected from sense channels. The collected data is decoded and subjected to differential processes. This results in a reduced common-mode signal, interference and noise. A touch response detection is carried out to choose at least one sense channel without touch response from sense channels as reference channel. This dynamically chosen reference channel reduces the risk of inaccurate touch location inference caused by abnormalities of static dummy reference channel and helps improve touch location detection accuracy, sense channels close to ends of capacitive touch control device are allowed to participate in touch response detection as other sense channels do, resulting in an expanded touch control range. The touch control chip and touch control display device all have similar advantages.

20 Claims, 4 Drawing Sheets

---

LOAD CODED DATA IN M DRIVE CHANNELS, COLLECT DATA FROM N SENSE CHANNELS, DECODE COLLECTED DATA TO OBTAIN DECODED DATA, AND PERFORM DIFFERENTIAL PROCESSES ON DECODED DATA TO FORM (N-1) DIFFERENTIAL SIGNALS, WHEREIN n-TH DIFFERENTIAL SIGNAL OF (N-1) DIFFERENTIAL SIGNALS RESULTS FROM DIFFERENTIAL PROCESS PERFORMED ON DECODED DATA OF n-TH AND (n+1)-TH SENSE CHANNELS OF N SENSE CHANNELS, AND WHEREIN M AND N ARE BOTH INTEGERS GREATER THAN 1, AND n IS POSITIVE INTEGER SMALLER THAN N — S1

PERFORM TOUCH RESPONSE DETECTION AND CHOOSE AT LEAST ONE SENSE CHANNEL WITHOUT TOUCH RESPONSE AS REFERENCE CHANNEL FROM N SENSE CHANNELS — S2

BACKWARD CONVERT (N-1) DIFFERENTIAL SIGNALS TO OBTAIN (N-1) CONVERTED SIGNALS SEQUENTIALLY CORRESPONDING TO (N-1) DIFFERENTIAL SIGNALS, EACH OF (N-1) CONVERTED SIGNALS BEING DIFFERENTIAL SIGNAL OF DECODED DATA OF REFERENCE CHANNEL AND RESPECTIVE ONE OF OTHER SENSE CHANNELS, (N-1) CONVERTED SIGNALS ARE USED TO OBTAIN TOUCH LOCATION — S3

TOUCH DETECTION METHOD, MEDIUM, TOUCH CONTROL CHIP AND TOUCH CONTROL DISPLAY DEVICE

CROSS-REFERENCES TO RELATED APPLICATION

This application claims the priority of Chinese patent application number 202110779037.9, filed on Jul. 9, 2021, the entire contents of which are incorporated herein by reference.

TECHNICAL FIELD

The present invention relates to the field of touch control and, in particular, to a touch detection method, a touch control chip and a touch control display device.

BACKGROUND

Capacitive touch control is a touch control technique that is often used in existing intelligent terminals, in which a touch control chip scans drive electrodes and sense electrodes in a capacitive touch control device to determine a touch location. Sense channels in the capacitive touch control device may include drive channels (Tx) for sending drive signals transmitted from the touch control chip and sense channels (Rx) for receiving sense signals to be collected by the touch control chip. The touch control chip may determine the touch location from output data from the sense channels.

For sufficient accuracy of a touch control action of an operator performed on the capacitive touch control device, a stable voltage difference must be ensured between a reference ground of the capacitive touch control device and a ground associated with the finger of the operator. However, in practice, the voltage difference may experience irregular changes, and a common-mode loop may result from contact between the operator and the capacitive touch control device, which may introduce common-mode noise to the sense signals. Such noise may corrupt the accuracy of the original sample data indicated in the received sense signals, leading to inaccurate or frequent false touch location detection, absence of response and other problems. Therefore, in order to enhance the touch location detection accuracy of the touch control chip, it is necessary to suppress the influence of common-mode noise on the sense signals.

One method of suppressing common-mode noise is to load coding signals through the drive channels and output an matrix of coded differential signals through the sense channels. The differential signals are then integrated and converted back to obtain the distribution of the touch locations. In order to additionally reduce the influence of common-mode noise and increase touch control sensitiveness, the integration and conversion may include taking an (leading or trailing) end one of the sense channels (Rx) as a dummy channel, thus the back-converted signals will be the difference between a signal corresponding to this dummy channel and signals corresponding to the other sense channel (Rx). This can remove noise present in the dummy sense channel. In this method, the signal from the dummy channel is taken as a reference for those from the other sense channels and is not counted in the touch location detection itself. However, this method causes a waste of the signal from the dummy channel, and if this reference signal is problematic, all the resulting signals for the touch control panel will be excessively strong or weak, leading to impaired accuracy of touch location detection.

SUMMARY OF THE INVENTION

In order to overcome the problem of inaccurate touch location detection of a coding approach that may be caused by abnormalities in a dummy reference channel and thus to provide improved touch location detection accuracy, the present invention presents a touch detection method. The present invention also provides a touch control chip and a touch control display device.

In one aspect of the present invention, there is provided a touch detection method, in which M drive channels and N sense channels are used to detect a touch location of a capacitive touch control device. The touch detection method includes:

loading coded data in the M drive channels, collecting data from the N sense channels, decoding the collected data to obtain decoded data, and performing differential processes on the decoded data to form (N−1) differential signals, wherein an n-th differential signal of the (N−1) differential signals results from a differential process performed on the decoded data of n-th and (n+1)-th sense channels of the N sense channels, and wherein M and N are both integers greater than 1, and n is a positive integer smaller than N; performing a touch response detection and choosing at least one sense channel without touch response as a reference channel from the N sense channels; and backward converting the (N−1) differential signals to obtain (N−1) converted signals sequentially corresponding to the (N−1) differential signals, each of the (N−1) converted signals being a differential signal of the decoded data of the reference channel and a respective one of the other sense channels, wherein the (N−1) converted signals are used to obtain the touch location.

Optionally, the touch detection method may further include: determining whether a degree of non-uniformity of the (N−1) differential signals obtained between every two adjacent ones of the N sense channels exceeds a prescribed value; if so, performing said touch response detection and choosing at least one sense channel without touch response from the N sense channels as said reference channel; and if not, choosing a first or N-th sense channel of the N sense channels as said reference channel without performing said touch response detection.

Optionally, the step of determining whether the degree of non-uniformity of the differential signals exceeds the prescribed value may further include: comparing a first or (N−1)-th differential signal of the (N−1) differential signals with each of the other differential signals and determining whether the differences all exceed a first predetermined threshold; if so, determining that the degree of non-uniformity of the (N−1) differential signals exceeds the prescribed value; and if not, determining that the degree of non-uniformity of the (N−1) differential signals does not exceed the prescribed value, wherein the first predetermined threshold is within a range of variation of differential signals in absence of a touch.

Optionally, the step of performing said touch response detection and choosing at least one sense channel without touch response from the N sense channels as a reference channel may further include: choosing a differential signal adjacent to the first or (N−1)-th differential signal of the (N−1) differential signals as a target differential signal; setting a touch response detection window which includes the target differential signal, wherein a size of the touch response detection window is k; and verifying whether differences between differential signals within the touch response detection window are all below a second predetermined threshold, if so, determining the sense channel corresponding to the target differential signal as the reference sense channel, and if not, shifting the target differential signal by k differential signals, and repeating the setting and verifying steps until a positive determination is obtained, wherein k is an integer greater than 1.

Optionally, k is equal to 3, and for an i-th differential signal being the target differential signal, if it is verified that the differences between the i-th differential signal and (i−1)-th and (i+1)-th differential signals are both below the second predetermined threshold and that a difference between the (i−2)-th and (i+1)-th differential signals or a difference between the (i−1)-th and (i+2)-th differential signals is below the second predetermined threshold, an i-th sense channel is determined as the reference sense channel, where i is an integer selected from 2 to (N−2).

Optionally, the step of loading the coded data in the M drive channels may further include: performing a plurality of coding actions using a code division multiple access scheme for assigning chip sequences to the respective drive channel, and wherein the step of decoding the collected data to obtain the decoded data may further include: performing a multi-channel accumulation on the collected data based on the chip sequences; and decoding the result of the multi-channel accumulation, resulting in the decoded data of the N sense channels.

Optionally, the touch detection method may further include: adding converted signals of all 0's for the reference channel.

Optionally, the step of performing differential processes on the decoded data to form said (N−1) differential signals may further include:

with the N sense channels being configured in a first pairing condition, loading the coded data in the M drive channels, collecting data from the N sense channels, decoding the collected data and performing differential processes for the first pairing condition to form a first number of differential signals; with the N sense channels being configured in a second pairing condition, loading the coded data in the M drive channels, collecting data from the N sense channels, decoding the collected data and performing differential processes for the second pairing condition to form a second number of differential signals; and obtaining the (N−1) differential signals by combining the first number of differential signals with the second number of differential signals in an order of the N sense channels.

Optionally, each differential process for the first and second pairing conditions may include obtaining the n-th differential signal from a differential process performed between the decoded data of the (n+1)-th sense channel and the n-th sense channel, wherein n is an odd number counting from 1 for the first pairing condition, and n is an even number counting from 2 for the second pairing condition.

Optionally, the touch detection method may further include, in the event of multiple sense channels without touch response being chosen as reference channels, with each of the multiple sense channels without touch response being taken as a respective reference channel, obtaining respective one of multiple sets of (N−1) converted signals, and averaging the multiple sets of (N−1) converted signals.

In one aspect of the present invention, there is provided touch control chip, in which M drive channels and N sense channels are used to detect at least one touch location of a capacitive touch control device. The touch control chip includes:

a coding and decoding module configured to load coded data in the M drive channels, collect data from the N sense channels, decode the collected data to obtain decoded data, and perform differential processes on the decoded data to form (N−1) differential signals, wherein n-th differential signal of the (N−1) differential signals results from a differential process performed on the decoded data of n-th and (n+1)-th sense channels of the N sense channels, and wherein M and N are both integers greater than 1, and n is a positive integer smaller than N;

a reference channel module configured to perform a touch response detection and choose at least one sense channel without touch response as a reference channel from the N sense channels; and a data conversion module configured to backward convert the (N−1) differential signals to obtain (N−1) converted signals sequentially corresponding to the (N−1) differential signals, each of the (N−1) converted signals being a differential signal of the decoded data of the reference channel and a respective one of the other sense channels, wherein the (N−1) converted signals are used to obtain the touch location.

Optionally, in the touch control chip, the reference channel module may further be configured to: determine whether a degree of non-uniformity of the (N−1) differential signals obtained between every two adjacent ones of the N sense channels exceeds a prescribed value; if so, perform said touch response detection and choose at least one sense channel without touch response from the N sense channels as said reference channel; and if not, choose a first or N-th sense channel of the N sense channels as said reference channel without performing said touch response detection.

Optionally, in the touch control chip, wherein the reference channel module may further be configured to: compare a first or (N−1)-th differential signal of the (N−1) differential signals with each of the other differential signals and determine whether the differences all exceed a first predetermined threshold; if so, determine that the degree of non-uniformity of the (N−1) differential signals exceeds the prescribed value; and if not, determine that the degree of non-uniformity of the (N−1) differential signals does not exceed the prescribed value, wherein the first predetermined threshold is within a range of variation of differential signals in absence of a touch.

Optionally, in the touch control chip, wherein the coding and decoding module may further be configured to: choose a differential signal adjacent to the first or (N−1)-th differential signal of the (N−1) differential signals as a target differential signal; set a touch response detection window which includes the target differential signal, wherein a size of the touch response detection window is k; and verify whether differences between differential signals within the touch response detection window are all below a second predetermined threshold, if so, determine the sense channel corresponding to the target differential signal as the reference sense channel, and if not, shift the target differential signal by k differential signals, and repeat the setting and verifying steps until a positive determination is obtained, wherein k is an integer greater than 1.

Optionally, in the touch control chip, wherein k is equal to 3, and for an i-th differential signal being the target differential signal, if it is verified that the differences between the i-th differential signal and (i−1)-th and (i+1)-th differential signals are both below the second predetermined threshold and that a difference between the (i−2)-th and (i+1)-th differential signals or a difference between the (i−1)-th and (i+2)-th differential signals is below the second predetermined threshold, an i-th sense channel is determined as the reference sense channel, where i is an integer selected from 2 to (N−2).

Optionally, in the touch control chip, wherein the coding and decoding module is further configured to: perform a plurality of coding actions using a code division multiple access scheme for assigning chip sequences to the respective drive channel, and perform a multi-channel accumulation on the collected data based on the chip sequences, and decode the result of the multi-channel accumulation, resulting in the decoded data of the N sense channels.

Optionally, in the touch control chip, wherein the coding and decoding module is further configured to: with the N sense channels being configured in a first pairing condition, load the coded data in the M drive channels, collect data from the N sense channels, decode the collected data and perform differential processes for the first pairing condition to form a first number of differential signals; with the N sense channels being configured in a second pairing condition, load the coded data in the M drive channels, collect data from the N sense channels, decode the collected data and perform differential processes for the second pairing condition to form a second number of differential signals; and obtain the (N−1) differential signals by combining the first number of differential signals with the second number of differential signals in an order of the N sense channels.

Optionally, in the touch control chip, wherein each differential process for the first and second pairing conditions may include obtaining an n-th differential signal from a differential process performed between the decoded data of the (n+1)-th sense channel and the n-th sense channel, and wherein n is an odd number counting from 1 for the first pairing condition, and n is an even number counting from 2 for the second pairing condition.

Optionally, in the touch control chip, wherein in the event of multiple sense channels without touch response being chosen as reference channels, with each of the multiple sense channels without touch response being taken as a respective reference channel, the data conversion module obtains respective one of multiple sets of (N−1) converted signals, and averages the multiple sets of (N−1) converted signals.

In one aspect of the present invention, there is provided a touch control display device including the touch control chip as defined above.

The touch detection method of the present invention embodiment has the following advantages. First, through loading coded data in the drive channels, decoding data collected from the sense channels and performing differential processes between the decoded signals to form differential signals, a reduced common-mode signal, interference and noise can be achieved. Second, the differential signals are backward converted based on at least one reference channel that is not a static dummy channel but is a dynamically chosen reference channel determined as being without touch response based on a touch response detection. That is, the reference channel in the present invention is dynamically chosen. This can reduce the risk of inaccurate touch location inference caused by abnormalities of a dummy reference channel and helps improve touch location detection accuracy. Third, in one embodiment, multiple modes are provided, and when it is determined that a degree of non-uniformity of the differential signals does not exceed a prescribed value, a static reference mode that consume less power may be selected without performing touch response detection, in which a sense channel close to an end of the capacitive touch control device is directly taken as a reference channel. Fourth, the dynamic selection of reference channel(s) allows the sense channels close to ends of the capacitive touch control device to participate in touch response detection as other sense channels do, resulting in an expanded touch control range.

Since the touch control chip and touch control display device of the present invention are based on the same essential concept as the touch detection method, they also have the same or similar advantages.

DETAILED DESCRIPTION

The present invention will be described in greater detail by way of specific embodiments with reference to the accompanying drawings. Advantages and features of the present invention will become more apparent from the following description. Note that the figures are provided in a very simplified form not necessarily drawn to scale for the only purpose of helping to explain the disclosed embodiments in a more convenient and clearer way.

Figure 1:
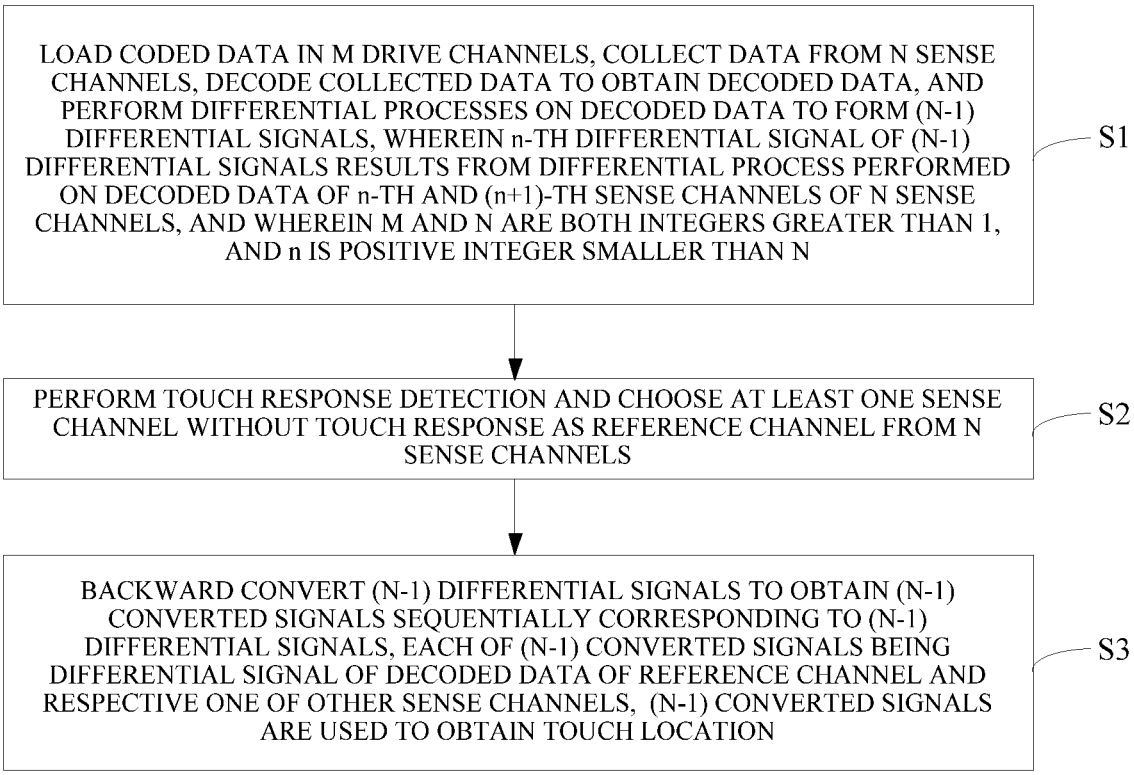
FIG. 1 is a flowchart of a touch detection method according to an embodiment of the present invention.

FIG. 1 is a flowchart of a touch detection method according to an embodiment of the present invention, which is implemented by a touch control chip. In an implementation, the touch control chip may be a control chip for a touch control display device. In an implementation, the touch detection method is implemented by hardware or software of a decoder in the touch control chip. As a non-limiting example, the decoder may be implemented as a digital signal processing (DSP) module or a microcontroller unit (MCU). Specifically, in the touch detection method, M drive channels and N sense channels are used to detect at least one touch location of the capacitive touch control device. The method includes, in step S1, loading coded data in the M drive channels and collecting data from the N sense channels. The collected data is then decoded to obtain decoded data, and differential processes are performed on the decoded data to form (N−1) differential signals. Each of the (N−1) differential signals corresponds to every two adjacent ones of the sense channels, and the n-th differential signal of the (N−1) differential signals results from a differential process performed on the decoded data of the n-th and (n+1)-th sense channels of the N sense channels. M and N are integers greater than 1, and n is a positive integer smaller than N.

Figure 2:
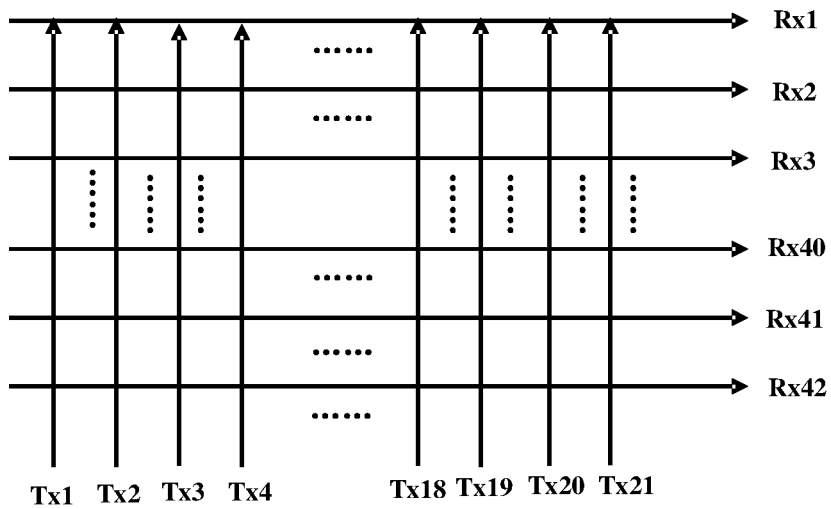
FIG. 2 is a schematic illustration of drive channels and sense channels according to an embodiment of the present invention.

Specifically, the M drive channels are configured for loading the coded data (i.e., chips) therein, and the N sense channels are configured to collect the coded data by means of capacitive coupling and to output the differential signals from associated circuits. FIG. 2 is a schematic illustration of the drive and sense channels according to an embodiment of the present invention. Referring to FIG. 2, in this embodiment, M=21 and N=42 as an example. That is, the capacitive touch control device includes twenty one drive channels (indicated at Tx1, Tx2, Tx3, . . . , Tx21) and forty two sense channels (indicated at Rx1, Rx2, Rx3, . . . , Rx42).

In step S1, the data may be coded with a coding approach known in the art. In this embodiment, in step S1, when loading coded data in the M drive channels, the data may be coded multiple times using a code division multiple access (CDMA) scheme to assign chip sequences to the respective drive channels. The data may be coded with an orthogonal code (which can be selected from Hadamard matrices) or a quasi-orthogonal code, such as an M code or a Walsh code. In case of coding 21 drive channels with an M code generally with a length of ($2^n$−1) bits (here, n is a positive integer), 21 M-code bits are necessary. Therefore, for example, with a 31-bit M-code with thirty one bits, the loading can be accomplished by coding each bit once (totally 31 times); or with a 15-bit M-code with fifteen bits, the loading can be accomplished by coding each bit twice (totally 30 times). When the drive channels are coded with a Walsh code generally with a length of 4n or $2^n$ (here, n is a positive integer), such as a 16-bit Walsh code with sixteen bits, the loading of the data in the twenty one drive channels can be accomplished by coding each bit twice (totally 32 times). Although the embodiments are described hereinafter in the context of an M code with a length of 31 bits being used to accomplish the loading by coding each bit once (totally 31 times), it should be understood that the present invention is not limited thereto.

Figure 3:
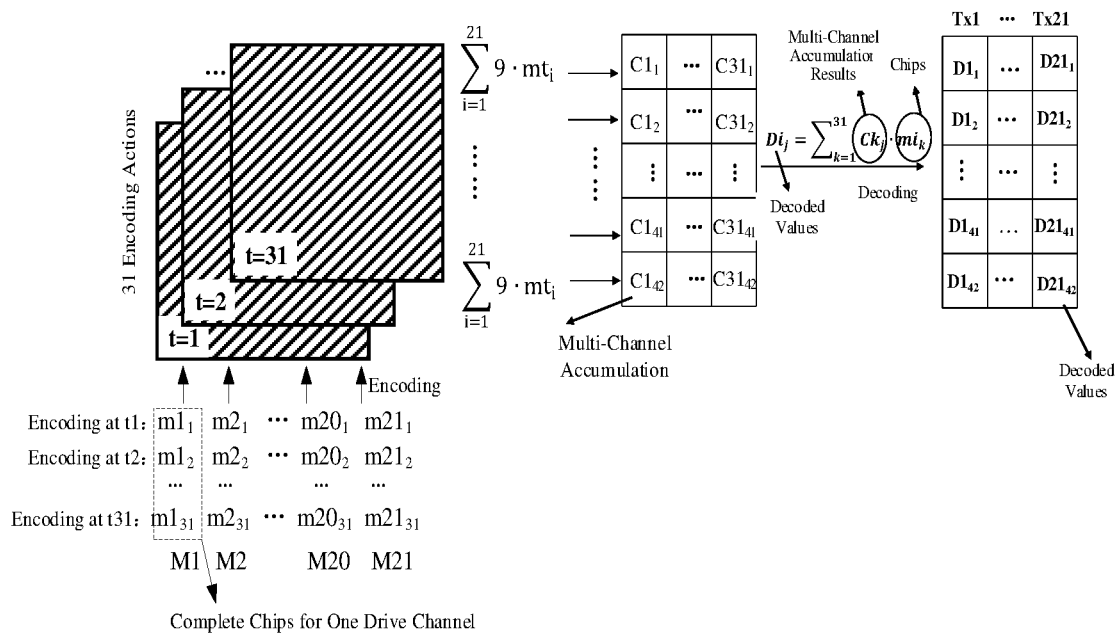
FIG. 3 schematically illustrates a coding and decoding process in the touch detection method according to an embodiment of the present invention.

FIG. 3 schematically illustrates the coding and decoding process in the touch detection method according to an embodiment of the present invention. Referring to FIG. 3, thirty one coding actions are taken respectively at times t1, t2, . . . , t31. To the $1^{st}$ to $21^{st}$ drive channels, chip vectors $m1_1$, $m2_1$, . . . , $m21_1$ are assigned at time t1, $m1_2$; $m2_2$, . . . , $m21_2$ at t2; . . . ; and $m1_{31}$, $m2_{31}$, . . . , $m21_{31}$ at t31. Each chip vector (e.g., $m21_{31}$) may be representative of 1 or −1. For each of the drive channels, the assigned 31 vectors make up a complete chip sequence, indicated at M1, M2, . . . , M20, M21. For example, the chip sequence for the first drive channel (Tx1) is M1=($m1_1$, $m1_2$, . . . , $m1_{31}$).

The loading of the coded data in the drive channels results in coding of these drive channels with respective chip sequences. The data then undergoes capacitive coupling and is collected and received by the sense channels. The collected data is then subjected to multi-channel accumulation and decoding. Referring to FIG. 3, specifically, multi-channel accumulation is first performed on the collected data. More specifically, for each coding action, data collected in the sense channels is accumulated across the drive channels. With 9-V voltage data being collected in the sense channels as an example, let $mt_i$ denote a chip vector coded in the i-th drive channel (i=1, 2, . . . , 21) in one coding action, then an accumulation result for the coding action across the twenty one drive channels is $\sum_{i=1}^{21} 9 \cdot mt_i$. In this way, a 42-row 31-column dataset can be l=1 obtained, in which the first row contains the multi-channel accumulation results of the first sense channel (Rx1) for the coding actions carried out respectively at times t1, t2, . . . , t31, designated $C1_1$, $C2_1$, . . . , $C31_1$; the second row contains the multi-channel accumulation results of the second sense channel (Rx2) for the coding actions carried out respectively at times t1, t2, . . . , t31, designated $C1_2$, $C2_2$, . . . , $C31_2$; . . . .

Referring again to FIG. 3, the multi-channel accumulation is followed by a decoding process resulting in decoded data for each sense channel. In this decoding process, inner products of the rows of the 42-row 31-column dataset and the chip vectors for the respective drive channels are taken as the decoded data for the sense channels. Referring to FIG. 3, the decoded data of the j-th sense channel (j=1, 2, . . . , 42) for the i-th drive channel (i=1, 2, . . . , 21) may be $Di_j = \sum_{k=1}^{31} Ck_j \cdot mi_k$, where k represents the number of coding actions.

The coding and decoding process will be further explained by way of a simplified example with two drive channels and four sense channels. In this example, voltage data received by the sense channels Rx may be $$\begin{pmatrix} 9 & 9 \\ 9 & 9 \\ 9 & 9 \\ 9 & 9 \end{pmatrix}.$$

The two columns of this voltage data correspond to the respective drive channels. Assuming 3 coding actions are taken for each channel, the chip vectors for the drive channels corresponding to the left and right columns of voltage data are (1, 1, −1) and (−1, 1, 1), respectively. In these vectors, each "1" represents a rising edge transitioning from −3V to 6V and thus corresponds to coded data of 9V, and each "−1" represents a falling edge transitioning from 6V to −3V and thus corresponds to coded data of −9V. When received by the sense channels $R_X$, a multi-channel accumulation process is performed, resulting in the 4-row 3-column dataset:

$$\begin{pmatrix} 0 & 18 & 0 \\ 0 & 18 & 0 \\ 0 & 18 & 0 \\ 0 & 18 & 0 \end{pmatrix},$$

in which the left, middle and right columns represent accumulated values for the three coding actions (9−9=0 at t1; 9+9=18 at t2; and −9+9=0 at t3). A decoding process then follows, in which inner products of the vectors resulting from the multi-channel accumulation process and the chip vectors for the drive channels are taken as decoded data. For example, the inner product of (0, 18, 0) and (1, 1, −1), i.e., 0*1+18*1+0*(−1)=18, is taken as decoded data of the first sense channel for the drive channel corresponding to the left column. In this way, a 4-row 2-column decoded dataset is obtained as $$\begin{pmatrix} 18 & 18 \\ 18 & 18 \\ 18 & 18 \\ 18 & 18 \end{pmatrix}.$$

It is noted that in the embodiment of FIG. 3, the coded data is loaded in the M drive channels by performing a plurality of code division multiple access (CDMA) coding actions so as to assign chip sequences to the respective drive channel. Thereafter, for each of the N sense channels, a multi-channel accumulation process is performed on the data (e.g., the aforementioned voltage data) collected by the N sense channels based on the chip sequences (e.g., the three chip vectors obtained from the chip sequences for the two drive channels), followed by a decoding process that results in decoded data corresponding to each of the N sense channels. It is noted that the coding and decoding process using a code division multiple access (CDMA) technique for obtaining the decoded data of the N sense channels is only one non-limiting embodiment of the present invention, and the coding and decoding process may be accomplished otherwise in alternative embodiments of the present invention.

The formation of the (N−1) differential signals in step S1 of FIG. 1 will be explained still in the context of the above example with twenty one drive channels and forty two sense channels. In one embodiment of the present invention, after the decoded data of each of the N sense channels is obtained from the coding and decoding process, the differential signals are formed by performing differential processes on the decoded data of adjacent two of the read channels (or sense channels). Inverting and non-inverting inputs of each associated differential op-amp are coupled to touch control capacitances of the corresponding adjacent two sense channels, and the difference between the input signals is output as an amplified current or charge signal. This can result in a reduced common-mode signal, interference and noise. In order to read the decoded data of all the pairs of adjacent sense channels for backward conversion into capacitance changes for all the sense channels, two complete coding, decoding and differential cycles (respectively in phase1 and phase2 conditions, in each of which, the sense channels are paired with their adjacent channels on the same side) are adopted.

Specifically, collecting the coded data from the sense channels, decoding the collected data and performing differential processes on the decoded data may include:

at first, with the N sense channels being configured in a first pairing condition, loading the coded data in the M drive channels, collecting data from the N sense channels, decoding the collected data and performing differential processes on the decoded data for the first pairing condition to form a first number of differential signals;

subsequently, with the N sense channels being configured in a second pairing condition, loading the coded data in the M drive channels, collecting data in the N sense channels, decoding the collected data and performing differential processes on the decoded data for the second pairing condition to form a second number of differential signals; and afterward, obtaining (N−1) differential signals by combining the first number of differential signals for the first pairing condition with the second number of differential signals for the second pairing condition in an order of the sense channels.

In one embodiment, each differential process for the first and second pairing conditions includes obtaining the n-th differential signal of the (N−1) differential signals from a differential process performed between the decoded data of the (n+1)-th sense channel and the n-th sense channel of the N sense channels, wherein n is an odd number counting from 1 for the first pairing condition, and is an even number counting from 2 for the second pairing condition. However, the present invention is not so limited. In an alternative embodiment, the n-th differential signal may also be obtained from a differential process performed between the decoded data of the n-th sense channel and the (n+1)-th sense channel. In this case, n is an odd number counting from the largest odd number not greater than N for the first pairing condition, and is an even number counting from the largest even number not greater than N for the second pairing condition.

Figure 4:
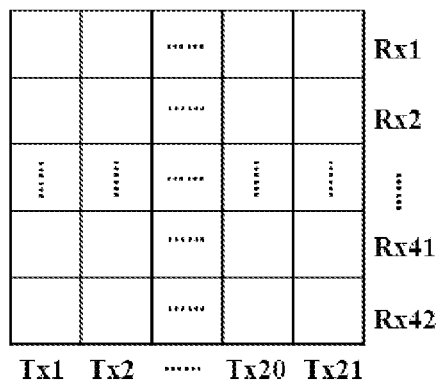
FIG. 4 is a diagram showing a decoded dataset resulting from the coding and decoding process in the touch detection method according to an embodiment of the present invention.

This is further described below. FIG. 4 is a diagram showing a decoded dataset resulting from the coding and decoding process in the touch detection method according to an embodiment of the present invention. Referring to FIG. 4, in this embodiment, the coding and decoding process result in a 42-rows (Rx) 21-column (Tx) decoded dataset. Each column (Tx) contains decoded data points to Rxi (i=1, 2, . . . , 42) of the respective rows. Each row (Rx) contains decoded data points to Txi (i=1, 2, . . . , 21) of the respective columns. The coding and decoding process includes a first coding and decoding cycle performed, for example, under a first pairing condition, in which Rx1 is paired with adjacent Rx2, Rx3 with adjacent Rx4, Rx5 with adjacent Rx6, . . . . Thus, for the first pairing condition, twenty one differential signals are obtained from the decoded data of each sense channel (Rx). Differential processes are performed on the decoded dataset of FIG. 4, resulting in a 21-row 21-column matrix in which data contained in each column Tx is:

$$\begin{pmatrix} Rx1-Rx2 \\ Rx3-Rx4 \\ Rx5-Rx6 \\ \cdots \\ Rx37-Rx38 \\ Rx39-Rx40 \\ Rx41-Rx42 \end{pmatrix}.$$

The coding and decoding process also includes a second coding and decoding cycle performed, for example, under a second pairing condition, in which Rx2 is paired with adjacent Rx3, Rx4 with adjacent Rx5, Rx6 with adjacent Rx7, . . . . Thus, for the second pairing condition, 20 differential signals are obtained from the decoded data of each sense channel (Rx). Differential processes are performed on the decoded dataset of FIG. 4, resulting in a 20-row 21-column matrix in which data contained in each column Tx is:

$$\begin{pmatrix} Rx2-Rx3 \\ Rx4-Rx5 \\ Rx6-Rx7 \\ \ldots \\ Rx36-Rx37 \\ Rx38-Rx39 \\ Rx40-Rx41 \end{pmatrix}.$$

The 21-row 21-column and 20-row 21-column matrices obtained from the above two cycles are then combined in the order of the sense channels, resulting in a complete 41-row 21-column differential matrix. In this 41-row 21-column differential matrix, each column corresponds to a respective one of the drive channels (Tx) contains 41 differential signals:

$$\begin{pmatrix} Rx1-Rx2 \\ Rx2-Rx3 \\ Rx3-Rx4 \\ \ldots \\ Rx39-Rx40 \\ Rx40-Rx41 \\ Rx41-Rx42 \end{pmatrix}.$$

After these differential signals are obtained, they will be backward converted next. Specifically, referring again to FIG. 1, the touch detection method of the present invention includes, in step S2, a touch response detection is performed and at least one of the N sense channels that is absent of touch response is chosen as a reference channel. In this way, according to the present invention, the backward conversion of the differential signals is based on a reference channel, which is not a static dummy channel but a channel dynamically determined as being absent of touch response based on the data of the rows of the differential matrix. In this dynamic reference mode, the dynamically chosen reference channel can reduce the risk of inaccurate touch position detection that may be caused by abnormalities in a dummy reference channel and allows improved touch location detection accuracy. This will be further explained below with reference to FIG. 8.

In some embodiments, only the dynamic reference mode is employed. In alternative embodiment, multiple modes including the dynamic-reference-channel mode and the static-reference-channel mode are both provided, and one of them can be chosen and used. In this case, constraints may be imposed on the use of the dynamic reference channel: if it is determined that a degree of non-uniformity of the (N−1) differential signals obtained between every two adjacent ones of the sense channels exceeds a prescribed value, the dynamic-reference-channel mode is selected, in which a reference channel is dynamically chosen based on a touch response detection; otherwise, the static-reference-channel mode is selected, in which an end sense channel close to an end of the capacitive touch control device (i.e., the first or N-th sense channel of the N sense channels) is directly taken as a reference channel, without performing any touch response detection. The static-reference-channel mode consumes less power.

In one embodiment, the method of determining whether the degree of non-uniformity of the (N−1) differential signals exceeds the prescribed value further comprises: assessing the non-uniformity of the data in each column of the differential matrix. Due to the presence of signal noise, even when there is no touch signal, the differential signals generated from the decoded data of the various sense channels would not be the same. In this embodiment, for each of the drive channel (i.e., each column of the differential matrix), determining whether the degree of non-uniformity of the corresponding (N−1) differential signals exceeds the prescribed value includes: comparing the first or (N−1)-th differential signal (i.e., an end differential signal) of the (N−1) differential signals with each of other differential signals (other than the end differential signal) and check whether all the differences exceed a first predetermined threshold. If so, then it is determined that the degree of non-uniformity of the (N−1) differential signals exceeds the prescribed value. Otherwise, it is determined that the degree of non-uniformity of the (N−1) differential signals does not exceed the prescribed value. The first predetermined threshold may be within a range of variation of differential signals in case there is no touch. If the degree of non-uniformity of the (N−1) differential signals in each column does not exceed the prescribed value, the static-reference-channel mode is selected.

In alternative embodiments, depending on a predetermined number of comparisons, it is possible to compare an end differential signal of the (N−1) differential signals with only some or all of the other differential signals.

Figure 5:
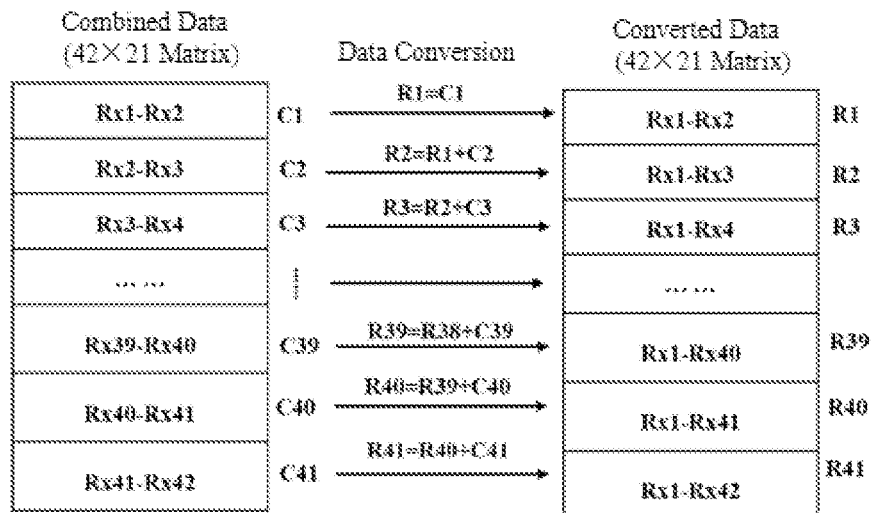
FIG. 5 schematically illustrates data conversion in the touch detection method according to an embodiment of the present invention.
Figure 6:
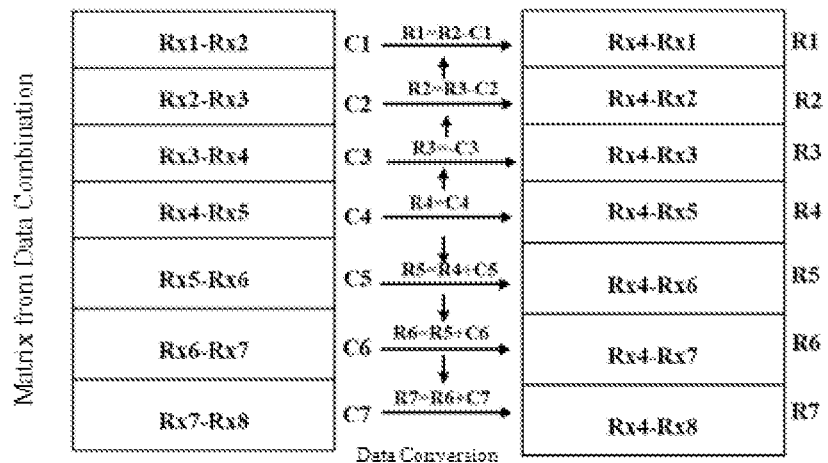
FIG. 6 schematically illustrates data conversion in the touch detection method according to an embodiment of the present invention.
Figure 7:
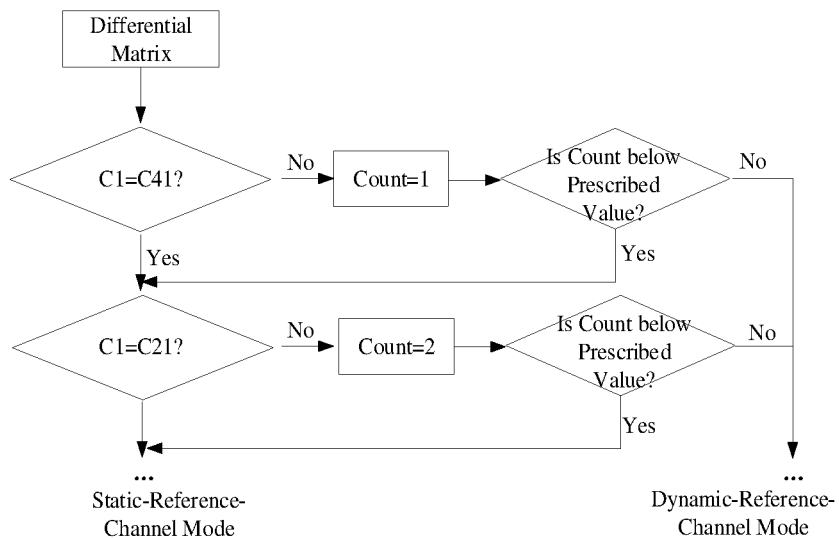
FIG. 7 is a flowchart of a process for determining a degree of non-uniformity of (N−1) differential signals in the touch detection method according to an embodiment of the present invention.

FIGS. 5 and 6 schematically illustrate data conversion accomplished with different sense channels as reference channels in the touch detection method according to two embodiments of the present invention. Referring to FIGS. 5 and 6, let Ci denote a row of the differential matrix, where i is an integer selected from 1-41. A degree of non-uniformity of differential signals for the respective drive channels is determined based on differences between Ci values in each column. Specifically, it is determined whether the differences between Ci values in each column exceed a predetermined threshold or not. Additional reference is made to FIG. 7, a flowchart of a process for determining the degree of non-uniformity of the (N−1) differential signals in the touch detection method according to an embodiment of the present invention. Referring to FIG. 7, optionally, the number of times where the difference exceeds the first predetermined threshold may be counted. If the count reaches a preset value, no further comparison may be done, and an appropriate one of the modes with different reference channels may be selected. Specifically, if the count of times where the difference exceeds the first predetermined threshold exceeds the preset value, the dynamic-reference-channel mode may be selected. If the count of times where the difference does not exceed the first predetermined threshold reaches the preset value, the static-reference-channel mode may be selected. The first predetermined threshold may be set or modified based on a series of tests. The first predetermined threshold is set within a range of variation of differential signals in case of no touch. Thus the static-reference-channel mode could be selected for scenarios without any touch or with minor dynamic noise, which dispenses with the touch response detection and consumes less power. For example, if there is absence of touch, the maximum difference between the differential signals in the differential matrix may be taken as the first predetermined threshold. In this case, if the difference between two differential signals is smaller than or equal to the first predetermined threshold, these signals may be considered as being equivalent. If the difference between two differential signals is greater than the first predetermined threshold, may be considered as being non-equivalent.

As an example, for the differential matrix of FIG. 5 or 6, with additional reference to FIG. 7, in each column, a comparison may be first made between C1 and C41 to see if the difference between them is smaller than the first predetermined threshold. If so (i.e., C1 is approximately equal to C41), the next sense channel is assessed. If not, a count (counting times where the difference exceeds the first predetermined threshold) is incremented. If the new count does not exceed the preset value, the next sense channel is assessed. For example, a comparison may be made between C1 and C21 to check if the difference between them is smaller than the first predetermined threshold. If so (i.e., C1 is approximately equal to C21), the next sense channel is assessed. If not, the count is incremented, and a determination is made of whether the new count exceeds the preset value. This process is repeated until the count exceeds the preset value (indicating a considerable degree of non-uniformity), or until the number of comparisons has reached a prescribed value (indicating a sufficiently high degree of uniformity). For example, if 5 differences between C1 and other Ci values (i=2, 3, . . . , 41) exceeds the first predetermined threshold, it may be determined that there is a significant degree of non-uniformity, and it is suitable to select the dynamic-reference-channel mode with a dynamically chosen reference channel. Otherwise, if the number of differences between C1 and other Ci values (i=2, 3, . . . , 41) in each column exceeding the first predetermined threshold does not exceed the preset value within a prescribed number of comparisons made between C1 and other Ci values, it may be determined that there is an insignificant degree of non-uniformity and it is suitable to select the static-reference-channel mode with a static reference channel. If there is no column with a count of differences between C1 and other Ci (i=2, 3, . . . , 41) exceeding the first predetermined threshold, it can be known that there is no touch on the screen and it is suitable to select the static-reference-channel mode.

In this embodiment, in the static-reference-channel mode, an end sense channel is chosen as a reference channel. The end sense channel may be, for example, that corresponding to the signal Rx1 (i.e., the first sense channel), or that corresponding to the signal Rx42 (i.e., the N-th sense channel).

The dynamic-reference-channel mode will be described below. As noted above, in step S2 of FIG. 1, a touch response detection is performed, and at least one sense channel without touch response is chosen as a reference channel. In the dynamic-reference-channel mode, according to the touch response detection, there may be more than one sense channel without touch response. If two or more sense channels are determined as being with no touch response, it is either possible to choose one of them as a reference channel for data backward conversion or to choose all of them as reference channels. In the latter case, two or more sets of (N−1) backward-converted signals may be obtained and then averaged. Specifically, a touch response detection for choosing a sense channel without touch response as a reference channel from the N sense channels is described herein: initially, a differential signal adjacent to one of the end differential signals (i.e., the first or (N−1)-th differential signal) is set as the target differential signal of the touch response detection, that is, the target differential signal is set to be the second or (N−2)-th differential signal in the first detection cycle. Then a touch response detection window which includes the target differential signal is set, wherein the size of the touch response detection window is k, and k represents the least number of sense channels having touch response when a touch happens. Then the touch response detection is performed to verify whether the differences between the signals within the window are all below a second predetermined threshold. If so, the detection process may be terminated, and the sense channel corresponding to the target differential signal may be determined as a sense channel without touch response, i.e., a reference channel. If not, a next detection cycle is initiated with the target differential signal shifted by k signals and then a next touch response detection window which includes the shifted target differential signal is set for the next detection cycle.

Figure 8:
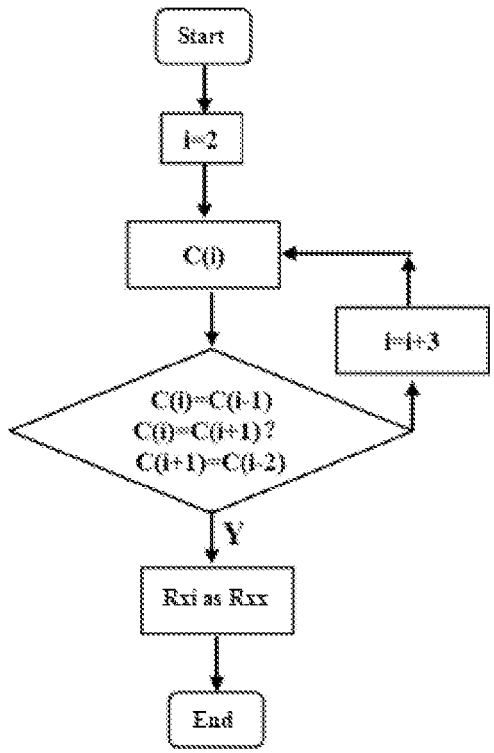
FIG. 8 schematically illustrates a touch response detection for determining a sense channel without touch response as a reference channel in the touch detection method according to an embodiment of the present invention.

FIG. 8 schematically illustrates a touch response detection for identifying a sense channel without touch response as a reference channel in the touch detection method according to an embodiment of the present invention. Let Ci denote differential signals to be assessed, that is, Ci denotes the target differential signal, wherein i may be an integer in the range of 2 to (N−2), and N represents the number of sense channels. In this embodiment, N=42, and i is an integer from 2 to 40. Referring to FIG. 8, in the touch response detection, the number k representing the least number of sense channels having touch response when a touch happens is equal to 3 for each column (Tx), and a first detection cycle is performed within an touch response detection window that includes a target differential signal C(i), which is the differential signal C2 (i=2) adjacent to the first differential signal C1 in the differential matrix initially. In this detection cycle, it is verified whether the differences between column-wise adjacent three differential signals are all below the second predetermined threshold. This threshold may be set or modified by a series of tests. For example, it may be set as the maximum difference among the differential signals for the respective drive channels in absence of a touch. For any adjacent two of the differential signals, if the difference between them is smaller than or equal to the second predetermined threshold, they are considered as approximately equivalent differential signals; otherwise, if the difference between the two differential signals is greater than the second predetermined threshold, the two signals are not considered as being equivalent. This cycle is successively repeated for different triplets of adjacent sense channels to check, in each of these sets, whether the difference between Ci and C(i−1) is smaller than or equal to the second predetermined threshold (i.e., whether Ci and C(i−1) are approximately equivalent) and whether Ci and C(i+1) are approximately equivalent. In some other embodiments, in each detection cycle, it may be also verified whether C(i+1) is approximately equivalent to C(i−2) (in this case, i≥3) or whether C(i−1) is approximately equivalent to C(i+2) (in this case, i≤39). That is, in addition to comparing the differential signals encompassed in the touch response detection window (i.e., Ci, C(i+1) and C(i−1)), an adjacent differential signal (C(i−2) or C(i+2)) is also involved. This can extend the distance of the chosen reference channel from any channel with touch response. Additionally, if C(i+1) is determined as being equivalent to C(i−2), or if C(i−1) is determined as being equivalent to C(i+2), then it means that there is no touch on the outermost channel, let alone the internal three channels. In the course of the touch response detection of differential data in the columns, if any detection cycle for a target differential signal C(i) satisfies the above two equations (i.e., C(i)=C(i+1) and C(i)=C(i−1)) or three equations (i.e., C(i)=C(i+1), C(i)=C(i−1) and C(i+1)=C(i−2); or C(i)=C(i+1), C(i)=C(i−1) and C(i−1)=C(i+2)), then it means there is no touch response in the sense channel corresponding to the target differential signal C(i) (i.e., the sense channel corresponding to the signal Rxi) and it is suitable for the corresponding sense channel Rxi to be chosen as a reference channel Rxx. During the touch response detection, if there are multiple sense channels determined as being with no touch response, it is preferred that one of them that is most distant from a sense channel with touch response is chosen as a reference channel.

Referring back to FIG. 1, the touch detection method of the present invention further comprises, in step S3, backward converting the (N−1) differential signals (for each drive channel) and thereby obtaining (N−1) converted signals sequentially corresponding to the respective (N−1) differential signals. Each of the (N−1) converted signals is a differential signal of the decoded data of the reference channel and a respective one of the other sense channels. Then a touch location can be inferred from the converted signals. In an embodiment, the conversion is accomplished by integration operations involving accumulation from the differential signals for the reference channel as the initial values of the accumulating operation.

Figure 9:
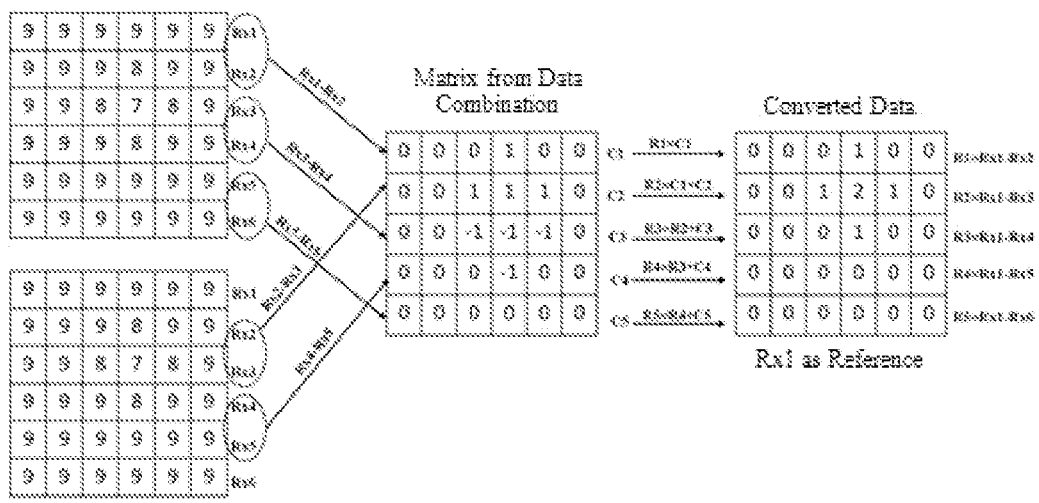
FIG. 9 shows a process from the formation of a differential matrix to data conversion in the touch detection method according to an embodiment of the present invention.

Referring to FIG. 5, in an embodiment with the top sense channel (i.e., the first sense channel Rx1) being chosen as a reference channel for data conversion based on a touch response detection, the differential signals for this channel are directly taken as converted signals without further processing. Moreover, from the adjacent second row downward, converted signals for each row are obtained by adding differential signals thereof to the respective converted signals of the previous row. Specifically, R1=C1, R2=R1+C2, R3=R2+C3, .... When combined with Ci (i=1, 2, 3, ..., 41) (Rx1−Rx2=C1, Rx2−Rx3=C2, Rx3−Rx4=C3, ...) in the differential matrix, we can obtain a converted matrix (41×21), with each column being given by R1=Rx1−Rx2, R2=Rx1−Rx3, R3=Rx1−Rx4, .... That is, each converted signal R is obtained taking the signal of the sense channel corresponding to Rx1 as the reference signal. Therefore, in this embodiment, from step S3, a 41-row 21-column converted matrix consisting of converted signals Ri corresponding to the respective differential signals Ci can be obtained, in which the data in each row is calculated based on the Rx1 signals (i.e., with the top sense channel as a reference channel). In order to illustrate this more clearly, FIG. 9 shows a simplified example (with 6 rows Rx and 6 columns Tx) of a complete process from combination of differential signals to data backward-conversion based on the resulting differential matrix, in which the sense channel corresponding to Rx1 is taken as a reference channel for the data conversion.

Referring to FIG. 6, in an embodiment with Rx4 being determined as a sense channel without touch response and thus chosen as a reference channel for data backward conversion based on a touch response detection, accumulation (integration) operations are performed with the decoded data of Rx4 signals, i.e., differential signals C4, as initial values. Specifically, combined with Ci (i=1, 2, 3, ..., 41) in the differential matrix, we obtain R4=C4=Rx4−Rx5. From R5 downward, converted signals for each row are obtained by adding differential signals thereof to the respective converted signals of the previous row. For example, R5=R4+C5, R6=R5+C6, .... Additionally, converted signals R3 are obtained as the additive inverses of the differential signals C3 (i.e., Rx3−Rx4), i.e., R3=Rx4−Rx3=−C3. From R2 downward, converted signals for each row are obtained by adding the additive inverses of differential signals thereof to the respective converted signals of the previous row (i.e., by performing negative integration). For example, R2=R3−C2=−(Rx3−Rx4)−(Rx2−Rx3)=Rx4−Rx2 and R1=R2−C1=Rx4−Rx1. That is, each converted signal Ri is obtained based on an initial value of the sense channel corresponding to Rx4. Therefore, in this embodiment, from step S3, a 41-row 21-column converted matrix consisting of converted signals corresponding to the respective differential signals for the drive channels can also be obtained, in which the data in each column is calculated based on the Rx4 signals.

In one embodiment, a row of all 0's may be added to the resulting 41-row 21-column converted matrix at the position of the reference channel (e.g., Rx4 in the above example), resulting a complete 42-rows 21-column converted matrix consisting of converted signals indicating changes in capacitance of the capacitive touch control device at various locations thereof. Therefore, a touch location can be inferred from the complete converted matrix, more precisely from the converted signals thereof, for example, using a method known in the art.

In order for improved data conversion accuracy to be achieved by avoiding the scenario where the choice of a single sense channel that is problematic leads to the obtainment of inaccurate signals for touch location inference, according to this embodiment, two or more sense channels may be chosen as reference channels, and two or more corresponding converted matrices may be generated by backward converting the differential signals for the drive channels based on the respective sense channels. Accordingly, the touch detection method may further include, for each drive channel, obtaining converted signals based on different reference channels and averaging the converted signals. The averaging may be performed for each output channel (Rx). For example, converted signals (Rx4−Rx1), (Rx4−Rx2), (Rx4−Rx3), ... obtained based on the signals of Rx4 as a reference channel and converted signals (Rx5−Rx1), (Rx5−Rx2), (Rx5−Rx3), ... obtained based on the signals of Rx5 as another reference channel may be averaged into ((Rx4−Rx1)+(Rx5−Rx1))/2, ((Rx4−Rx2)+(Rx5−Rx2))/2, ((Rx4−Rx3)+(Rx5−Rx3))/2, ..., from which a touch location can be inferred.

The touch detection method of the present invention has the following advantages. First, through loading coded data in the drive channels, decoding data collected from the sense channels and performing differential processes on the decoded signals to form differential signals, a reduced common-mode signal, interference and noise can be achieved. Second, the differential signals are backward converted based on at least one reference channel that is not a static dummy channel but is a dynamically chosen reference channel determined as being without touch response based on data in the rows of the differential matrix. This can reduce the risk of inaccurate touch location inference caused by abnormalities of a dummy reference channel and helps improve touch location detection accuracy. Third, in one embodiment, multiple modes are provided, and when it is determined that a degree of non-uniformity of the differential signals does not exceed a prescribed value, a static-reference-channel mode that consume less power may be selected without performing touch response detection, in which a sense channel close to an end of the capacitive touch control device is directly taken as a reference channel. Fourth, the dynamic selection of reference channel(s) allows the sense channels close to ends of the capacitive touch control device to participate in touch response detection as other sense channels do, resulting in an expanded touch control range.

The processing and implementation of the touch detection method of the present invention are generally accomplished by both software programs and hardware. However, they can also be accomplished entirely (or in part) by electronic hardware or software programs. Regardless of whether software or hardware is used, the necessary individual components are known to those familiar with the arts of electronics and the software, so a detailed description thereof is deemed unnecessary and omitted herein.

Embodiments of the present invention relate to a computer-readable storage medium storing thereon a computer program, which, when executed by a processor, carries out the above touch detection method. Examples of the computer-readable storage medium may include CD-ROMs, HDDs, memory devices in computer system, storage means communicating via lines, and so forth.

Embodiments of the present invention relate to a touch control chip, which can be incorporated in any suitable electronic device with capacitive touch control capabilities for touch location detection. The touch control chip utilizes M drive channels and N sense channels to detect a touch location of a capacitive touch control device and comprises:

a coding and decoding module configured to load coded data in the M drive channels, collect data from the N sense channels, decode the collected data to obtain decoded data, and perform differential processes on the decoded data to form (N−1) differential signals, wherein the n-th differential signal of the (N−1) differential signals results from a differential process performed on the decoded data of the n-th and (n+1)-th sense channels of the N sense channels, and wherein M and N are both integers greater than 1, and n is a positive integer smaller than N;

a reference channel module configured to perform a touch response detection and choose at least one sense channel without touch response as a reference channel from the N sense channels; and a data conversion module configured to backward convert the (N−1) differential signals to obtain (N−1) converted signals sequentially corresponding to the (N−1) differential signals, each of the (N−1) converted signals being a differential signal of the decoded data of the reference channel and a respective one of the other sense channels, wherein the converted signals are used to obtain the touch location.

It is to be noted that the coding and decoding module, reference channel module and data conversion module of the touch control chip may be implemented either as hardware circuits in the touch control chip, or as software such as firmware of a programming MCU in a DSP. Apparently, the above-described touch detection method can be carried out by the touch control chip. Therefore, the foregoing description of the touch detection method also applies to the touch control chip, and a further description thereof is thus omitted.

Embodiments of the present invention relate to a touch control display device incorporating the above-described touch control chip. The touch control display device has touch control and display capabilities provided by a display screen and a touch control layer disposed on the display screen. A touch on the touch control layer may cause a change in the content being displayed on the display screen. The display screen may be an OLED, LED or LCD screen. Examples of the touch control display device may include mobile phones, personal computers, laptops, personal digital assistants (PDAs), watch phones, media players, navigation devices, game consoles, tablet computers, wearable devices, access control electronic systems, keyless vehicle entry systems and keyless vehicle ignition systems.

Since the computer-readable storage medium, touch control chip and touch control display device are based on the same essential concept as the touch detection method, they also have the same or similar advantages.

The method and device embodiments disclosed herein are described in a progressive manner, with the description of each succeeding embodiment focusing on its differences from preceding one(s). Reference can be made between different embodiments as appropriate.

While the invention has been described above with reference to several preferred embodiments, it is not intended to be limited to these embodiments in any way. In light of the teachings hereinabove, any person of skill in the art may make various possible variations and changes to the disclosed embodiments without departing from the scope of the invention. Accordingly, any and all such simple variations, equivalent alternatives and modifications made to the foregoing embodiments without departing from the scope of the invention are intended to fall within the scope thereof.

What is claimed is:

1. A touch detection method, which is implemented by a touch control chip, wherein M drive channels and N sense channels are used to detect at least one touch location of a capacitive touch control device, and wherein the touch detection method comprises:

loading coded data in the M drive channels, collecting data from the N sense channels, decoding the collected data to obtain decoded data, and performing differential processes on the decoded data to form (N−1) differential signals, wherein an n-th differential signal of the (N−1) differential signals results from a differential process performed on the decoded data of n-th and (n+1)-th sense channels of the N sense channels, and wherein M and N are both integers greater than 1, and n is a positive integer smaller than N;

performing a touch response detection and choosing at least one sense channel without touch response as a reference channel from the N sense channels; and backward converting the (N−1) differential signals to obtain (N−1) converted signals sequentially corresponding to the (N−1) differential signals, each of the (N−1) converted signals being a differential signal of the decoded data of the reference channel and a respective one of the other sense channels, wherein the (N−1) converted signals are used to obtain the touch location.

2. The touch detection method of claim 1, further comprising:

determining whether a degree of non-uniformity of the (N−1) differential signals obtained between every two adjacent ones of the N sense channels exceeds a prescribed value; if so, performing said touch response detection and choosing at least one sense channel without touch response from the N sense channels as said reference channel; and if not, choosing a first or N-th sense channel of the N sense channels as said reference channel without performing said touch response detection.

3. The touch detection method of claim 2, wherein the step of determining whether the degree of non-uniformity of the (N−1) differential signals exceeds the prescribed value further comprises:

comparing a first or (N−1)-th differential signal of the (N−1) differential signals with each of the other differential signals and determining whether the differences all exceed a first predetermined threshold; if so, determining that the degree of non-uniformity of the (N−1) differential signals exceeds the prescribed value; and if not, determining that the degree of non-uniformity of the (N−1) differential signals does not exceed the prescribed value, wherein the first predetermined threshold is within a range of variation of differential signals in absence of a touch.

4. The touch detection method of claim 1, wherein the step of performing said touch response detection and choosing at least one sense channel without touch response from the N sense channels as a reference channel further comprises:

choosing a differential signal adjacent to the first or (N−1)-th differential signal of the (N−1) differential signals as a target differential signal;

setting a touch response detection window which includes the target differential signal, wherein a size of the touch response detection window is k; and verifying whether differences between differential signals within the touch response detection window are all below a second predetermined threshold, if so, determining the sense channel corresponding to the target differential signal as the reference sense channel, and if not, shifting the target differential signal by k differential signals, and repeating the setting and verifying steps until a positive determination is obtained, wherein k is an integer greater than 1.

5. The touch detection method of claim 4, wherein k is equal to 3, and for an i-th differential signal being the target differential signal, if it is verified that the differences between the i-th differential signal and (i−1)-th and (i+1)-th differential signals are both below the second predetermined threshold and that a difference between the (i−2)-th and (i+1)-th differential signals or a difference between the (i−1)-th and (i+2)-th differential signals is below the second predetermined threshold, an i-th sense channel is determined as the reference sense channel, where i is an integer selected from 2 to (N−2).

6. The touch detection method of claim 1, wherein the step of loading the coded data in the M drive channels further comprises:

performing a plurality of coding actions using a code division multiple access scheme for assigning chip sequences to the respective drive channel, and wherein the step of decoding the collected data to obtain the decoded data further comprises:

performing a multi-channel accumulation on the collected data based on the chip sequences; and decoding the result of the multi-channel accumulation, resulting in the decoded data of the N sense channels.

7. The touch detection method of claim 1, further comprising:

adding converted signals of all 0's for the reference channel.

8. The touch detection method of claim 1, wherein the step of performing differential processes on the decoded data to form said (N−1) differential signals further comprises:

with the N sense channels being configured in a first pairing condition, loading the coded data in the M drive channels, collecting data from the N sense channels, decoding the collected data and performing differential processes for the first pairing condition to form a first number of differential signals;

with the N sense channels being configured in a second pairing condition, loading the coded data in the M drive channels, collecting data from the N sense channels, decoding the collected data and performing differential processes for the second pairing condition to form a second number of differential signals; and obtaining the (N−1) differential signals by combining the first number of differential signals with the second number of differential signals in an order of the N sense channels.

9. The touch detection method of claim 8, wherein each differential process for the first and second pairing conditions comprises obtaining an n-th differential signal from a differential process performed between the decoded data of the (n+1)-th sense channel and the n-th sense channel, and wherein n is an odd number counting from 1 for the first pairing condition, and n is an even number counting from 2 for the second pairing condition.

10. The touch detection method of claim 1, further comprising, in the event of multiple sense channels without touch response being chosen as reference channels, with each of the multiple sense channels without touch response being taken as a respective reference channel, obtaining respective one of multiple sets of (N−1) converted signals, and averaging the multiple sets of (N−1) converted signals.

11. A touch control chip, wherein M drive channels and N sense channels are used to detect at least one touch location of a capacitive touch control device, and wherein the touch control chip comprises:

a coding and decoding module configured to load coded data in the M drive channels, collect data from the N sense channels, decode the collected data to obtain decoded data, and perform differential processes on the decoded data to form (N−1) differential signals, wherein n-th differential signal of the (N−1) differential signals results from a differential process performed on the decoded data of n-th and (n+1)-th sense channels of the N sense channels, and wherein M and N are both integers greater than 1, and n is a positive integer smaller than N;

a reference channel module configured to perform a touch response detection and choose at least one sense channel without touch response as a reference channel from the N sense channels; and a data conversion module configured to backward convert the (N−1) differential signals to obtain (N−1) converted signals sequentially corresponding to the (N−1) differential signals, each of the (N−1) converted signals being a differential signal of the decoded data of the reference channel and a respective one of the other sense channels, wherein the (N−1) converted signals are used to obtain the touch location.

12. The touch control chip of claim 11, the reference channel module is further configured to:

determine whether a degree of non-uniformity of the (N−1) differential signals obtained between every two adjacent ones of the N sense channels exceeds a prescribed value; if so, perform said touch response detection and choose at least one sense channel without touch response from the N sense channels as said reference channel; and if not, choose a first or N-th sense channel of the N sense channels as said reference channel without performing said touch response detection.

13. The touch control chip of claim 12, wherein the reference channel module is further configured to:

compare a first or (N−1)-th differential signal of the (N−1) differential signals with each of the other differential signals and determine whether the differences all exceed a first predetermined threshold; if so, determine that the degree of non-uniformity of the (N−1) differential signals exceeds the prescribed value; and if not, determine that the degree of non-uniformity of the (N−1) differential signals does not exceed the prescribed value, wherein the first predetermined threshold is within a range of variation of differential signals in absence of a touch.

14. The touch control chip of claim 11, wherein the coding and decoding module is further configured to:
choose a differential signal adjacent to the first or (N−1)-th differential signal of the (N−1) differential signals as a target differential signal;
set a touch response detection window which includes the target differential signal, wherein a size of the touch response detection window is k; and
verify whether differences between differential signals within the touch response detection window are all below a second predetermined threshold, if so, determine the sense channel corresponding to the target differential signal as the reference sense channel, and if not, shift the target differential signal by k differential signals, and repeat the setting and verifying steps until a positive determination is obtained, wherein k is an integer greater than 1.

15. The touch control chip of claim 14, wherein k is equal to 3, and for an i-th differential signal being the target differential signal, if it is verified that the differences between the i-th differential signal and (i−1)-th and (i+1)-th differential signals are both below the second predetermined threshold and that a difference between the (i−2)-th and (i+1)-th differential signals or a difference between the (i−1)-th and (i+2)-th differential signals is below the second predetermined threshold, an i-th sense channel is determined as the reference sense channel, where i is an integer selected from 2 to (N−2).

16. The touch control chip of claim 11, wherein the coding and decoding module is further configured to:
perform a plurality of coding actions using a code division multiple access scheme for assigning chip sequences to the respective drive channel, and perform a multi-channel accumulation on the collected data based on the chip sequences, and decode the result of the multi-channel accumulation, resulting in the decoded data of the N sense channels.

17. The touch control chip of claim 11, wherein the coding and decoding module is further configured to:
with the N sense channels being configured in a first pairing condition, load the coded data in the M drive channels, collect data from the N sense channels, decode the collected data and perform differential processes for the first pairing condition to form a first number of differential signals;
with the N sense channels being configured in a second pairing condition, load the coded data in the M drive channels, collect data from the N sense channels, decode the collected data and perform differential processes for the second pairing condition to form a second number of differential signals; and
obtain the (N−1) differential signals by combining the first number of differential signals with the second number of differential signals in an order of the N sense channels.

18. The touch control chip of claim 17, wherein each differential process for the first and second pairing conditions comprises obtaining an n-th differential signal from a differential process performed between the decoded data of the (n+1)-th sense channel and the n-th sense channel, and wherein n is an odd number counting from 1 for the first pairing condition, and n is an even number counting from 2 for the second pairing condition.

19. The touch control chip of claim 11, wherein in the event of multiple sense channels without touch response being chosen as reference channels,
with each of the multiple sense channels without touch response being taken as a respective reference channel, the data conversion module obtains respective one of multiple sets of (N−1) converted signals, and averages the multiple sets of (N−1) converted signals.

20. A touch control display device, comprising a touch control chip, M drive channels and N sense channels, and wherein the touch control chip comprises:
a coding and decoding module configured to load coded data through the M drive channels, collect data from the N sense channels, decode the collected data to obtain decoded data, and perform differential processes on the decoded data to form (N−1) differential signals, wherein n-th differential signal of the (N−1) differential signals results from a differential process performed on the decoded data of n-th and (n+1)-th sense channels of the N sense channels, and wherein M and N are both integers greater than 1, and n is a positive integer smaller than N;
a reference channel module configured to perform a touch response detection and choose at least one sense channel without touch response as a reference channel from the N sense channels; and
a data conversion module configured to backward convert the (N−1) differential signals to obtain (N−1) converted signals sequentially corresponding to the (N−1) differential signals, each of the (N−1) converted signals being a differential signal of the decoded data of the reference channel and a respective one of the other sense channels, wherein the (N−1) converted signals are used to obtain at least one touch location of a capacitive touch control device.

* * * * *